United States Patent  
Lind et al.

(10) Patent No.: US 9,463,793 B2
(45) Date of Patent: Oct. 11, 2016

(54) METHOD FOR TRANSITION BETWEEN DRIVING MODES

(71) Applicant: VOLVO CAR CORPORATION, Gothenburg (SE)

(72) Inventors: Henrik Lind, Torslanda (SE); Erik Coelingh, Alvangen (SE); Mattias Erik Brannstrom, Gothenburg (SE); Peter Harda, Torslanda (SE); Julia Nilsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/676,007

(22) Filed: Apr. 1, 2015

(65) Prior Publication Data

US 2015/0283998 A1    Oct. 8, 2015

(30) Foreign Application Priority Data

Apr. 8, 2014    (EP) ..................................... 14163798

(51) Int. Cl.
*B60W 30/00*    (2006.01)
*B60W 10/04*    (2006.01)
(Continued)

(52) U.S. Cl.
CPC .............. *B60W 30/00* (2013.01); *B60W 10/04* (2013.01); *B60W 10/18* (2013.01); *B60W 10/20* (2013.01);
(Continued)

(58) Field of Classification Search
CPC ...................... G05D 2201/0213; G05D 1/024; G05D 1/0274; G05D 1/0055; G05D 1/0061; G05D 1/021; G05D 1/0212; G05D 1/0223; G05D 1/0246; G05D 1/0257; G05D 1/0278; B60W 50/082; B60W 30/00; B60W 2600/00; B60W 50/14; B60W 10/18; B60R 16/023; B62D 15/025; G08B 21/02; G08B 21/06

USPC .................. 701/1, 23, 25, 26, 31.4, 42, 430; 340/576, 928; 705/7.42
See application file for complete search history.

(56) References Cited

U.S. PATENT DOCUMENTS 6,853,903 B2    2/2005    Michi et al.
2009/0287367 A1*    11/2009    Salinger ............... G05D 1/0246
                                                                                      701/23

(Continued)

FOREIGN PATENT DOCUMENTS

DE        10218017           11/2003
DE        102006060554      6/2008
DE        102011085167      4/2013

OTHER PUBLICATIONS

Extended European Search Report for European Application No. 14163798.3, Completed by the European Patent Office, Dated Sep. 16, 2014, All together 6 Pages.

*Primary Examiner* — Behrang Badii
*Assistant Examiner* — Sanjeev Malhotra
(74) *Attorney, Agent, or Firm* — Brooks Kushman P.C.

(57) ABSTRACT

A method for transition between driving modes of a vehicle is disclosed. The driving modes include an autonomous driving (AD) mode, a partly autonomous driving (PAD) mode and a manual driving (MD) mode. A transition from the PAD mode to the AD mode is performed by enabling the AD mode. A transition from the AD mode to the PAD mode is performed by releasing a steering wheel lock when the PAD mode is in an enabled state. A transition from the MD mode to the AD mode is performed by enabling the AD mode. A transition from the AD mode to the MD mode is performed by releasing the steering wheel lock when the PAD mode is in a disabled state. A system for performing the method and a vehicle including the system are also disclosed.

14 Claims, 2 Drawing Sheets

(51) Int. Cl.
   *B60W 10/18*   (2012.01)
   *B60W 10/20*   (2006.01)
   *B60W 50/08*   (2012.01)
   *B60W 30/12*   (2006.01)
   *B60W 30/16*   (2012.01)
   *B60W 30/17*   (2012.01)
   *B60W 50/00*   (2006.01)

(52) U.S. Cl.
   CPC .............. *B60W 30/12* (2013.01); *B60W 30/16* (2013.01); *B60W 30/17* (2013.01); *B60W 50/082* (2013.01); *B60K 2350/925* (2013.01); *B60K 2350/928* (2013.01); *B60W 2050/0067* (2013.01); *B60W 2510/09* (2013.01); *B60W 2510/18* (2013.01); *B60W 2510/20* (2013.01)

(56) References Cited

U.S. PATENT DOCUMENTS

| | | | |
|---|---|---|---|
| 2010/0250066 A1 | 9/2010 | Eckstein et al. | |
| 2010/0318256 A1* | 12/2010 | Breuer | B60T 7/22 701/31.4 |
| 2012/0083960 A1* | 4/2012 | Zhu | G05D 1/0214 701/23 |
| 2012/0239238 A1* | 9/2012 | Harvey | G05D 1/0221 701/25 |
| 2013/0079991 A1* | 3/2013 | Schmidt | B62D 6/00 701/42 |
| 2013/0131905 A1* | 5/2013 | Green | G05D 1/0055 701/23 |
| 2013/0325244 A1* | 12/2013 | Wang | G05D 1/028 701/26 |
| 2014/0139341 A1* | 5/2014 | Green | B60K 28/06 340/576 |
| 2014/0156133 A1* | 6/2014 | Cullinane | B60W 30/00 701/23 |
| 2014/0156182 A1* | 6/2014 | Nemec | G05D 1/021 701/430 |
| 2014/0207535 A1* | 7/2014 | Stefan | G05D 1/0022 705/7.42 |
| 2014/0210646 A1* | 7/2014 | Subramanya | B61L 29/28 340/928 |
| 2014/0330478 A1* | 11/2014 | Cullinane | B60W 30/00 701/23 |
| 2014/0358327 A1* | 12/2014 | Nordbruch | B60W 50/082 701/1 |
| 2014/0365062 A1* | 12/2014 | Urhahne | B60W 50/16 701/23 |

* cited by examiner

METHOD FOR TRANSITION BETWEEN DRIVING MODES

CROSS-REFERENCE TO RELATED APPLICATIONS

This application claims foreign priority benefits under 35 U.S.C. §119(a)-(d) to European Patent Application No. EP 14163798.3, filed Apr. 8, 2014, which is incorporated by reference in its entirety.

TECHNICAL FIELD

The present disclosure relates to a method for transition between driving modes of a vehicle. The disclosure further relates to a system for performing the method and a vehicle comprising the system.

BACKGROUND

Modern vehicles may be equipped with an increasing amount of sensing systems and communication devices in order to be able to collect information about the vehicle itself and its surroundings. Examples are radar and camera sensors that monitor the traffic in front of the vehicle, such that a driver can be assisted in avoiding rear-end collisions. Also wireless communication, such as 3G and LTE mobile communication, may be used to obtain information about e.g. traffic jams. GPS in combination with maps may be used for navigation.

It is known to equip a vehicle with a driver assist system, such as ACC, i.e. adaptive cruise control and/or LKA, i.e. lane keeping aid. Other systems help to avoid or reduce the consequences of a collision, such as a Collision Avoidance System.

Further, vehicles are being developed, which are able to drive, at least partly, autonomously. Driving autonomously has the potential to make driving safer, more environmental-friendly and more comfortable. Drivers may be allowed to spend time on reading, emailing or eating instead of paying attention to the surrounding traffic.

A vehicle may comprise both a system for autonomous driving, providing an autonomous driving mode, in combination with a driver assist system and/or a system for partly autonomous driving. It is then desirable that transitions between the driving modes of the different systems may be made in a smooth way. It is further desirable that it is clear to the driver when transitions are made, such that the driver knows which driving mode is being utilized at a certain moment.

SUMMARY

An object of some embodiments of the present disclosure is to overcome or ameliorate at least one of the disadvantages of the prior art, or to provide a useful alternative.

The object above may be achieved by embodiments of the present disclosure. Embodiments are set forth in the appended claims, in the following description and in the drawings.

Thus, in one exemplary aspect of the present disclosure there is provided a method for transition between driving modes of a vehicle, the driving modes comprising an autonomous driving mode, a partly autonomous driving mode and a manual driving mode, wherein (i) a transition from the partly autonomous driving mode to the autonomous driving mode is performed by enabling the autonomous driving mode, (ii) a transition from the autonomous driving mode to the partly autonomous driving mode is performed by releasing a steering wheel lock when the partly autonomous driving mode is in an enabled state, (iii) a transition from the manual driving mode to the autonomous driving mode is performed by enabling the autonomous driving mode, and (iv) a transition from the autonomous driving mode to the manual driving mode is performed by releasing the steering wheel lock when the partly autonomous driving mode is in a disabled state.

The driving modes of the vehicle comprise an autonomous driving mode, AD mode, a partly autonomous driving mode, PAD mode, and a manual driving mode, MD mode. In the autonomous driving mode the driver is out of the loop, while for the other driving modes there is a driver in the loop, as is further explained below.

The concept of autonomous driving or automated driving means that the vehicle is driven without human interaction, i.e. with a 100% automation level, completely autonomously, herein called the autonomous driving mode. The driver is then out of the loop, i.e. he/she does not perform any control of the driving.

A reference to 0% automation level corresponds to that the driver has not enabled any driver assist systems, except for driver assist systems which are default at vehicle start-up, e.g. an anti-lock braking system and a collision avoidance system, and the vehicle is fully driven by the driver, herein called the manual driving mode. The driver may e.g. use his/her hands and/or feet to drive the vehicle. The driver is in the loop, such that he/she can perform the actions required to drive the vehicle.

The vehicle may have an automation level, such that 0%<automation level<100%, which herein is denoted the partly autonomous driving mode. The partly autonomous driving mode may also be referred to as semi-autonomous driving. In the partly autonomous driving mode, the vehicle may autonomously perform some actions, e.g. keeping a suitable distance to the vehicle ahead, while the driver performs other actions, e.g. overtaking another vehicle when appropriate. The closer to 100% automation level, the more actions are performed autonomously by the vehicle.

An example of a partly autonomous driving mode is Traffic Jam Assist, TJA. A TJA system helps the driver to follow a lead vehicle, i.e. another vehicle being in front of the vehicle hosting the TJA system. The TJA system controls speed of the host vehicle, distance to the lead vehicle and also steers into the direction of the lead vehicle as long as it remains in the lane. The TJA system is available for speeds up to a first predetermined speed level, e.g. up to 50 km/h. The driver has to supervise the system and this may be ensured by requiring that the driver has at least one hand on the steering wheel.

For speeds up to a second predetermined speed level, which is lower than the first predetermined speed level, TJA can be fully automated under certain conditions. This function is called A-TJA, Automated Traffic Jam Assist. A-TJA may be used when there is a lead vehicle and is an example of an autonomous driving mode.

Another example of an autonomous driving mode is automatic parking, which normally is performed at low speeds.

Autonomous driving in general may be performed by utilizing various sensor systems of the vehicle.

The driver may be helped by a driver assist system, such as ACC, i.e. adaptive cruise control and/or C-LKA, i.e. comfort lane keeping aid. The ACC can assist the driver with the longitudinal vehicle control, e.g. by maintaining a speed and/or keeping a safe distance to a lead vehicle. The C-LKA can assist the driver with the lateral vehicle control, e.g. to stay in the lane. These driver assist systems are typically intended to be active at higher speeds, e.g. when driving on a high-way. The driver is in the loop, such that he/she can perform other actions than those performed by the driver assist system. The vehicle may, when using the driver assist systems, be said to be in the partly autonomous driving mode, e.g. having an automation level of up to 25%. The driver can decide to activate one or more of the driver assist systems, e.g. by pressing a button. The driver assist system may then be activated if the system is available. There may also be a prerequisite to allow activation, such that the speed should be above a certain speed limit.

Enabling and disabling of the autonomous driving mode and/or the partly autonomous driving mode may be made by means of an enabling switch, such as a button or virtual button. The enabling switch may have two states, enabled and disabled, i.e. not enabled. The button may e.g. be pressed to select enabling. The button may then stay in a pressed position, indicating to the user of the vehicle that the driving mode is enabled. When the button is pressed again, the driving mode may be disabled. The button may then stay in an un-pressed position, indicating to the user of the vehicle that the driving mode is not enabled. As an alternative, or as a complement to being physically pressed, the button may be arranged to remember in which state it is. The state may be indicated by a visual signal, e.g. a light in the button, indicating the state of the button. There may be separate switches for the different driving modes, i.e. an AD enabling switch and a PAD enabling switch. The driving modes may also be enabled and disabled by other kinds of switches known to the skilled person, e.g. a virtual button on a touch-screen, a slide control, a joy-stick etc. The enabling switch or switches may be located at a steering wheel of the vehicle, at a dashboard or a console.

The method as disclosed herein offers the user of the vehicle a smooth way to transit between the different driving modes. It is made clear to the driver when transitions are made between the different driving modes. It is made clear to the driver in which driving mode the vehicle is driving at a certain moment.

Which driving mode to enter when leaving the autonomous driving mode, in (ii) and (iv) above, may be determined by checking if the partly autonomous driving mode is enabled or disabled, e.g. by determining the setting of the PAD enabling switch. If the partly autonomous driving mode is enabled, the autonomous driving mode may transfer to the partly autonomous driving mode. If the partly autonomous driving mode is not enabled, the autonomous driving mode may transfer to the manual driving mode instead when releasing the steering wheel lock.

The actions in (iii) may further comprise selecting resume to resume a previous setting, e.g. by activating a resume switch. Thereby it is possible to go back to settings, which have previously been used in the autonomous driving mode, e.g. going back to settings being used the last time the autonomous driving mode was used.

The action of releasing the steering wheel lock in (ii) and/or (iv) may comprise (a) disabling the autonomous driving mode or selecting deactivation, and within a predefined time interval performing at least one action selected from holding the steering wheel, activating a confirmation switch and/or performing a normal driving action, the normal driving action comprising to brake, to steer and/or to accelerate, or (b) performing a firm driving action, the firm driving action comprising to brake, to steer and/or to accelerate, the firm driving action being harder than the normal driving action, e.g. by pressing a pedal harder or turning the steering wheel more quickly.

As mentioned above, disabling the autonomous driving mode may relate to pressing the AD enabling switch to disable it. As an alternative, or a complement, the driving mode may be deactivated by selecting a "0"-switch, which is further described below. In order to confirm the disabling or deactivation action, another action is performed within the predefined time interval, such as holding the steering wheel, activating a confirmation switch or performing a normal driving action. The predefined time interval may be between 0 and 5 seconds, between 0 and 3 seconds, and/or between 0 and 1.5 seconds.

A confirmation switch, such as a OK button, may be located on the steering wheel, on the dashboard or on the console between the seats. The confirmation switch may be used to confirm a previous action, e.g. to confirm the disabling or deactivation action.

Normal driving action relates to driving actions of the kind being commonly performed when in the manual driving mode to drive the vehicle under normal traffic conditions, such as braking, steering and/or accelerating.

The normal driving actions differ from the firm driving actions, which relate to forceful braking, steering and/or accelerating. Firm driving actions may e.g. be performed in order to avoid or mitigate the consequences of a collision. Purely as an example, if a moose runs out on the road, the driver may brake forcefully and/or try to steer around the moose. The force levels of these actions are much higher than normal force levels and would be deemed as firm driving actions.

Data may be gathered for a driver in order to establish what his or her normal driving actions on an individual level are, or data may be used for drivers in general. The differentiation between normal and firm driving actions may be set as a percentage level, such that firm actions occur if the driving action is above a certain force level, e.g. at least 100% higher than a normal driving action.

The actions of (i) and/or (iii) may further comprise that the transition to the autonomous driving mode is performed by including an action of releasing the steering wheel of the vehicle, such that there is no hand on the steering wheel any more. This may be performed as a deliberate action from the driver, who takes his or her hands off the steering wheel when transferring into the autonomous driving mode.

As an alternative, or a complement, the transition to the autonomous driving mode may include checking if the driver has a hand on the steering wheel when in the autonomous driving mode, and in that case inform or warn the driver that there is a hand on the steering wheel, which hand may potentially disturb the system for autonomous driving.

The method may further comprise (v) a transition from the manual driving mode to the partly autonomous driving mode is performed by enabling the partly autonomous driving mode, and (vi) a transition from the partly autonomous driving mode to the manual driving mode is performed by de-activating the partly autonomous driving mode by braking, steering, selecting deactivation and/or by disabling the partly autonomous driving mode.

The partly autonomous driving mode may be deactivated by selecting a "0"-switch, i.e. selecting deactivation.

The actions in (v) may further comprise selecting resume, e.g. by activating a "resume"-switch. Thereby it is possible to go back to settings, which have previously been used in the partly autonomous driving mode, e.g. going back to settings being used the last time the partly autonomous driving mode was used.

The method may include that a transition to the partly autonomous driving mode or to the autonomous driving mode is performed only if a speed of the vehicle is equal to or below a predefined speed. The level of the predefined speed may be selected based on type of driving mode, road conditions, traffic conditions, weather conditions, time of the day etc.

Purely as an example, it may be unsuitable to enter the autonomous driving mode if the speed of the vehicle is too high, e.g. above the predefined level, if the road has a poor quality and/or the road is not included in a map database of roads suitable for autonomous driving.

Similar criteria, possibly with other acceptance levels, may be used for the partly autonomous driving mode.

The method may further comprise-transmitting an information signal indicating which of the driving modes is being utilized.

The information signal may be visual, audible and/or haptic. Example of an information signal is that a lamp may be turned on, a symbol may be high-lighted on the dashboard or on a display, a switch may change color or be high-lighted, the steering wheel may change color or be high-lighted, the appearance of a display in the vehicle may change, a position of the seat may be changed, a position of the steering wheel may change, an acoustic signal may be sent, the haptic feeling of the steering wheel may change, the haptic feeling of the seat may change. One or more information signals may be used in parallel and/or in sequence.

The information will help to make the user of the vehicle, in particular the driver, understand in which driving mode the vehicle is being driven at a certain moment.

One example of such an information signal is a perceived turning resistance of the steering wheel, which may be set to relate to which of the driving modes is being utilized at a particular moment. Substantially no turning resistance may indicate that the manual driving mode is being utilized. A low turning resistance may indicate that the partly autonomous driving mode is being utilized. A high turning resistance may indicate that the autonomous driving mode is being utilized. The turning resistance levels indicating the different driving modes may be pre-selectable.

The method may further comprise that an information signal is transmitted if the steering wheel is touched while driving in the autonomous driving mode, e.g. the information signal comprising changing appearance of the AD enabling switch, e.g. by back-lightening it.

If the driver puts a hand on the steering wheel in the autonomous driving mode, it may be suitable to inform or warn the driver, e.g. by the perceived turning resistance or by another of the above-mentioned information signals, that there is a hand on the steering wheel, which hand may potentially disturb the system for autonomous driving.

In addition, or as a complement, the method may further comprise indicating if a driving mode is available, e.g. if the autonomous driving mode is available. The indication of an available driving mode may be indicated continuously, when the driver asks for it and/or when the driver tries to activate the driving mode.

The partly autonomous driving mode may be enabled or disabled while being in the autonomous driving mode. The enabling or disabling of the partly autonomous driving mode may thus be done without exiting the autonomous driving mode. This opportunity may e.g. be provided by having two separate enabling switches, the AD enabling switch and the PAD enabling switch, as described above.

If the driver tries to enable a driving mode at a certain moment and the system does not allow enabling of that driving mode at that moment, e.g. due to that it would not be safe, it will not be possible to activate that driving mode at that moment. If the driver in that case continues trying to activate that driving mode, e.g. by repeatedly pressing the enabling switch, the driver may be informed that that driving mode cannot be activated at that moment, e.g. by displaying information at a display. As an option, the driver may also be informed about why it is not possible to activate that driving mode, about an expected time or distance until that driving mode may be activated and/or about how long, time-wise or distance-wise, that driving mode may remain activated once it is possible to activate it.

The method may further comprise to check if activating a certain driving mode, e.g. the autonomous driving mode or the partly autonomous driving mode, would lead to that the vehicle would be in a safe state or an unsafe state. If the state is deemed to be unsafe upon activation, it may be made impossible for the driver to activate the driving mode, until the vehicle is deemed to be in a safe state upon activation of that driving mode.

In another exemplary aspect of the present disclosure, there is provided a system for performing the method as disclosed herein for transition between driving modes of a vehicle, the driving modes comprising an autonomous driving mode, a partly autonomous driving mode and a manual driving mode. The system comprises—an enabling switch for enabling and disabling the autonomous driving mode, e.g. an AD enabling switch, and—an enabling switch for enabling and disabling the partly autonomous driving mode, e.g. a PAD enabling switch.

The enabling switches have been described above.

The system for performing the method may comprise at least one additional switch, e.g. a button. The additional switch may have at least two states, wherein a first state corresponds to activation and a second state corresponds to deactivation. The states may correspond to physical positions of the button: the button being physically pressed corresponding to activated, and physically un-pressed corresponding to deactivated. The function of the additional switch may be related to one of the above-mentioned enabling switches for the autonomous driving mode and/or the partly autonomous driving mode. The additional switch may comprise a "+"-switch for increasing a set speed of the active driving mode, a "−"-switch for decreasing a set speed of the active driving mode, a "resume"-switch for resuming a previous setting and/or a "0"-switch for deactivating the active driving mode. The active driving mode is the driving mode being utilized at that moment.

The system may further comprise—a hand presence determining system for determining at least one hand on the steering wheel of the vehicle.

When in the autonomous driving mode a hand on the steering wheel may potentially disturb the system for autonomous driving, and it may thus be desirable that there is no hand on the steering wheel.

The hand presence determining system may be used to determine the absence of a hand on the steering wheel. The hand presence determining system may comprise a sensor in the steering wheel sensing e.g. touch, pressure, capacitance and/or torque. The hand presence determining system may comprise a camera or IR camera overlooking the steering wheel.

One or more of the AD enabling switch for the autonomous driving mode, the PAD enabling switch for the partly autonomous driving mode and/or one or more of the additional switches described above may be adapted to be located on the steering wheel of the vehicle. Thereby they are within a convenient reach distance for the driver.

The system may comprise the confirmation switch mentioned above which may be used to confirm a previous action, e.g. to confirm the disabling or deactivation action.

The system may comprise a driving action determining system, which may be adapted to distinguish between a normal driving action and a firm driving action. As mentioned above, the firm driving action is more forceful than the normal driving action, e.g. by pressing a pedal harder or turning the steering wheel more quickly. The driving action determining system may e.g. be adapted to determine a force used to press the pedal or turn the steering wheel. As an alternative, or a complement, the driving action determining system may determine a speed of the action, e.g. the pressing speed for a pedal or the turning speed for a steering wheel.

The system may further comprise other subsystems for performing the actions of the method mentioned herein.

In another exemplary aspect of the present disclosure, there is provided a vehicle comprising the system for performing the method as disclosed herein for transition between driving modes of a vehicle, a steering wheel, a system for autonomous driving, and a system for partly autonomous driving.

Such a vehicle is suitable for performing different driving modes comprising the autonomous driving mode, the partly autonomous driving mode and the manual driving mode.

The vehicle may comprise a speed measurement system, which may be the normal speed measurement system of the vehicle used by the driver in the manual driving mode. The speed measurement system may be utilized to ascertain that a transition to the partly autonomous driving mode or to the autonomous driving mode is performed only if a speed of the vehicle is equal to or below a predefined speed. The level of the predefined speed may be selected based on type of driving mode, road conditions, traffic conditions, weather conditions, time of the day etc.

BRIEF DESCRIPTION OF THE DRAWINGS

The present disclosure will hereinafter be further explained by means of non-limiting examples with reference to the appended drawings wherein.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
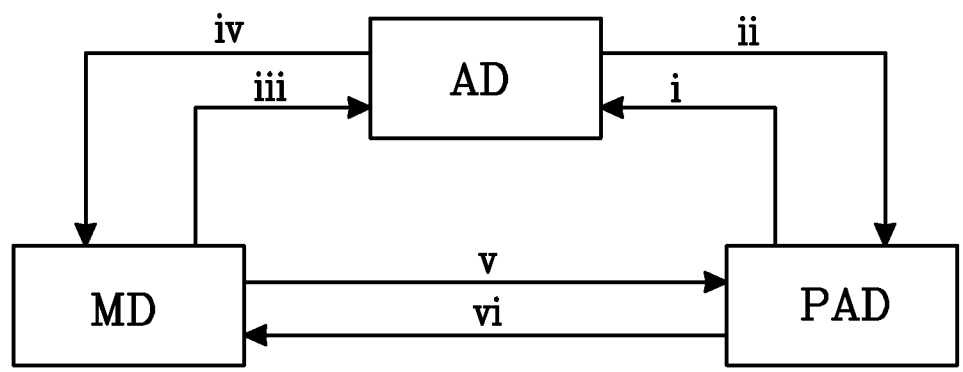
FIG. 1 is a diagram illustrating transitions between different driving modes in a method according to the disclosure, FIG. 2 schematically illustrates a vehicle according to the disclosure, and FIG. 3 schematically illustrates a system according to the disclosure.

FIG. 1 is a diagram illustrating transitions between different driving modes of a vehicle.

The driving modes of the vehicle comprise an autonomous driving mode, AD mode, a partly autonomous driving mode, PAD mode, and a manual driving mode, MD mode. In the autonomous driving mode, the driver is out of the loop, while for the other driving modes there is a driver in the loop, as is further explained above.

A transition (i) from the partly autonomous driving mode, PAD mode, to the autonomous driving mode, AD mode is performed by enabling the autonomous driving mode.

A transition (ii) from the AD mode to the PAD mode is performed by releasing a steering wheel lock when the PAD mode is in an enabled state.

A transition (iii) from the MD mode to the AD mode is performed by enabling the AD mode, and A transition (iv) from the AD mode to the MD mode is performed by releasing the steering wheel lock when the PAD mode is in a disabled state.

A transition (v) from the MD mode to the PAD mode is performed by enabling the PAD mode.

A transition (vi) from the PAD mode to the MD mode is performed by de-activating the PAD mode by braking, steering, selecting deactivation and/or by disabling the PAD mode.

The actions in (iii) may further comprise selecting resume. Thereby it is possible to go back to settings, which have previously been used in the autonomous driving mode, e.g. going back to settings being used the last time the autonomous driving mode was used.

The action of releasing the steering wheel lock in (ii) and/or (iv) may comprise (a) disabling the autonomous driving mode or selecting deactivation, and within a predefined time interval performing at least one action selected from holding the steering wheel, activating a confirmation switch and/or performing a normal driving action, the normal driving action comprising to brake, steer and/or accelerate, or (b) performing a firm driving action, the firm driving action comprising to brake, steer and/or accelerate, the firm driving action being harder than the normal driving action, e.g. by pressing a pedal harder or turning the steering wheel more quickly.

The actions in (i) and/or (iii) may further comprise that the transition to the autonomous driving mode is performed by including an action of releasing the steering wheel of the vehicle, such that there is no hand on the steering wheel any more. This may be performed as a deliberate action from the driver, who takes his or her hands off the steering wheel when transferring into the autonomous driving mode.

As an alternative, or a complement, the transition to the autonomous driving mode may include checking if the driver has a hand on the steering wheel when in the autonomous driving mode, and in that case inform or warn the driver that there is a hand on the steering wheel, which hand may potentially disturb the system for autonomous driving.

The actions in (v) may further comprise selecting resume, e.g. by activating a "resume"-switch. Thereby it is possible to go back to settings, which have previously been used in the partly autonomous driving mode, e.g. going back to settings being used the last time the partly autonomous driving mode was used.

The method may include that a transition to the partly autonomous driving mode or to the autonomous driving mode is performed only if a speed of the vehicle is equal to or below a predefined speed. The level of the predefined speed may be selected based on type of driving mode, road conditions, traffic conditions, weather conditions, time of the day etc.

Purely as an example, it may be unsuitable to enter the autonomous driving mode if the speed of the vehicle is too high, e.g. above the predefined level, if the road has a poor quality and/or the road is not included in a map database of roads suitable for autonomous driving.

Similar criteria, possibly with other acceptance levels, may be used for the partly autonomous driving mode.

The method may further comprise-transmitting an information signal indicating which of the driving modes is being utilized.

In addition, or as a complement, the method may further comprise indicating if a driving mode is available, e.g. if the autonomous driving mode is available. The indication of an available driving mode may be indicated continuously, when the driver asks for it and/or when the driver tries to activate the driving mode.

Figure 2:
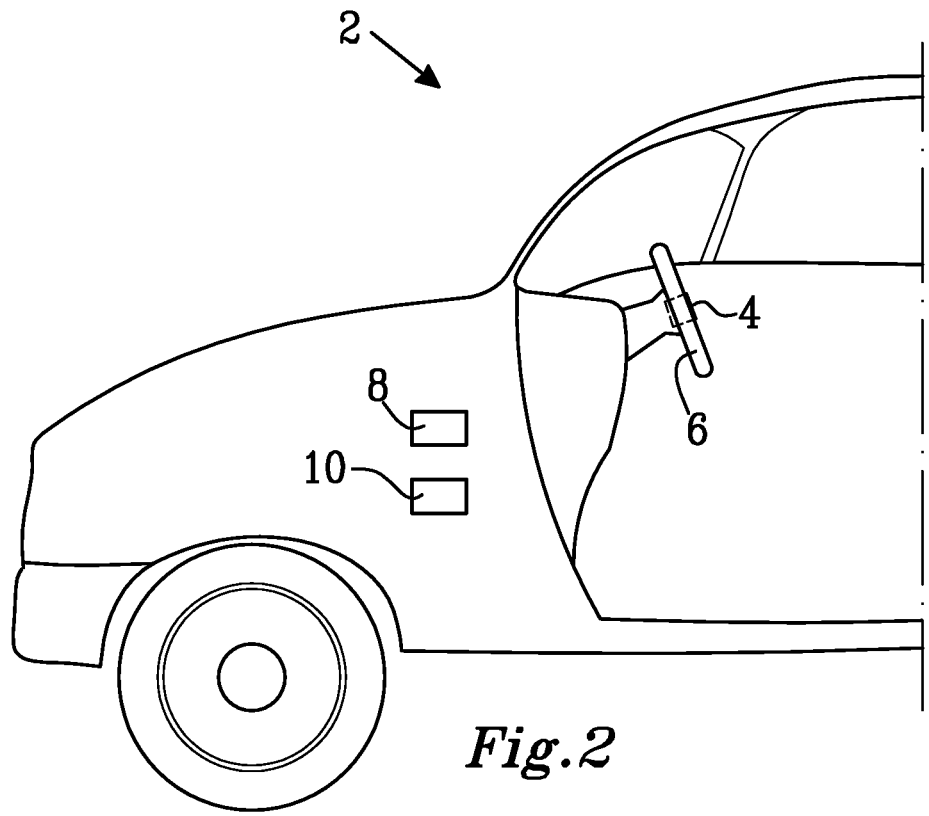
Figure 3:
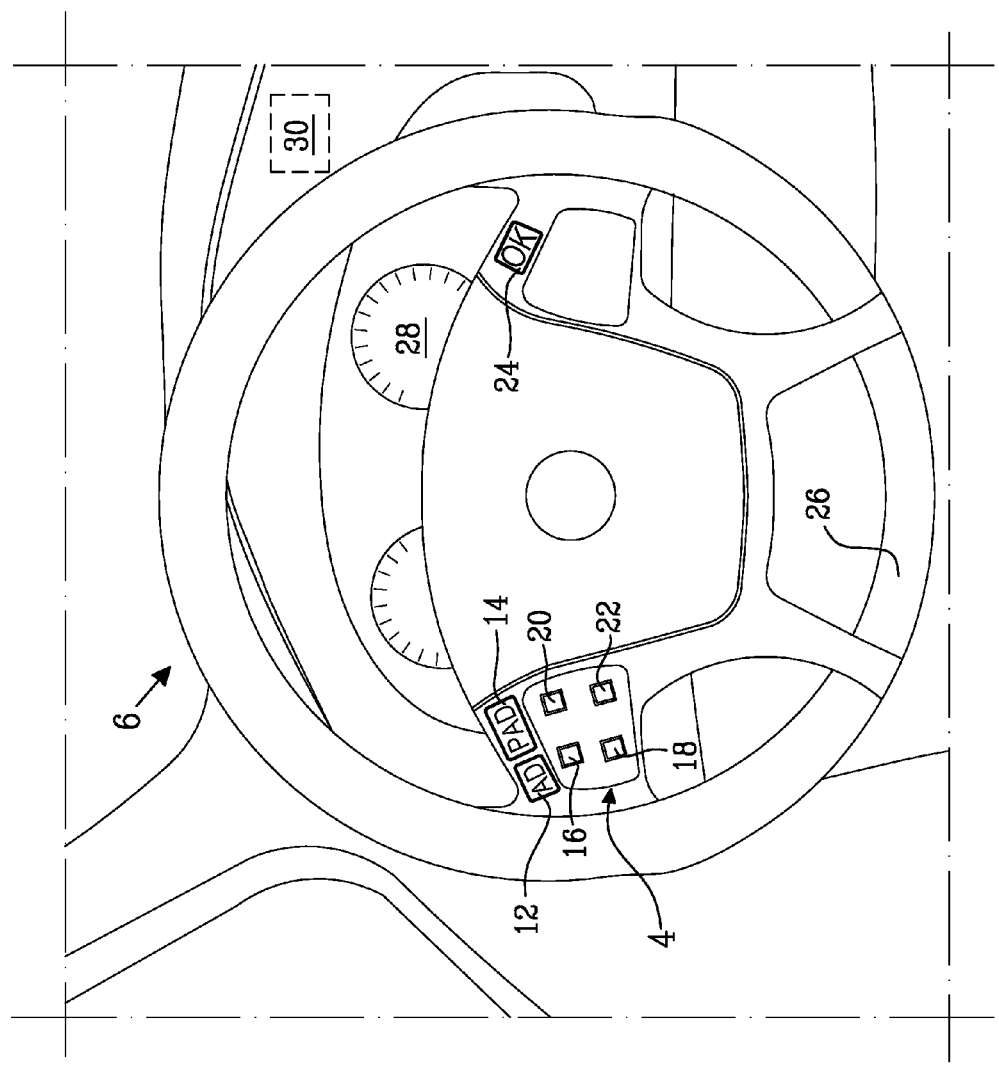

FIG. 2 schematically illustrates a vehicle 2 according to the disclosure and FIG. 3 schematically illustrates a system 4 according to the disclosure for performing the method disclosed herein for transition between different driving modes of a vehicle.

The vehicle 2 comprises the system 4, a steering wheel 6, a system 8 for autonomous driving, and a system 10 for partly autonomous driving.

The system 4 for performing the method disclosed herein comprises an AD enabling switch 12 and a PAD enabling switch 14. These may be e.g. located on the steering wheel 6, on a dashboard or on a console between the front seats within convenient reach for the driver of the vehicle 2. The AD and/or PAD switch 12, 14 may comprise a button, as in the illustrated embodiment of FIG. 3. The button has two positions, enabled and disabled, i.e. not enabled. The button may e.g. be pressed to select enabling. The button may then stay in a pressed position, indicating to the user of the vehicle 2 that the driving mode is enabled. In addition the button may be highlighted or a symbol on it may be high-lighted. When the button is pressed again, the driving mode may be disabled. The button may then stay in an un-pressed position, indicating to the user of the vehicle 2 that the driving mode is disabled, i.e. not enabled. As an alternative, or as a complement to being physically pressed, the button may be arranged to remember in which state it is. The state may be indicated by a visual signal, e.g. a light in the button, indicating the state of the button.

The system 4, as an option, comprises one or more additional switches, e.g. buttons. The additional switches are arranged to have at least two states, wherein a first state corresponds to activation and a second state corresponds to deactivation. The states may correspond to physical positions of the button: the button being physically pressed corresponding to activated, and physically un-pressed corresponding to deactivated. The function of the additional switch may be related to one of the above-mentioned enabling switches 12, 14 for the autonomous driving mode and/or the partly autonomous driving mode. The additional switch may comprise a "+"-switch 16 for increasing a set speed of the active driving mode, a "−"-switch 18 for decreasing a set speed of the active driving mode, a "resume"-switch 20 for resuming a previous setting and/or a "0"-switch 22 for deactivating the active driving mode. The active driving mode is the driving mode being utilized at that moment.

The system may further comprise a confirmation switch 24. In the illustrated embodiment, the confirmation switch 24 is in located on the steering wheel 6, but may e.g. also be on the dashboard or on the console between the seats. The confirmation switch 24 is used to confirm a previous action, e.g. to confirm the disabling or deactivation action.

The system further, as an option, comprises a hand presence determining system 26 for determining at least one hand on the steering wheel 6 of the vehicle 2. When in the autonomous driving mode a hand on the steering wheel 6 may potentially disturb the system for autonomous driving 8, and it may thus be desirable that there is no hand on the steering wheel 6.

The hand presence determining system 26 may be used to determine the absence of a hand on the steering wheel 6. The hand presence determining system 26 may comprise a sensor in the steering wheel 6 feeling e.g. touch, pressure, capacitance and/or torque. The hand presence determining system 26 may comprise a camera or IR camera overlooking the steering wheel 6.

The vehicle 2 further comprises, as an option, a speed measurement system. It may be the normal speed measurement system 28 of the vehicle 2 used by the driver in the manual driving mode. The speed measurement system 28 may be utilized to ascertain that a transition to the partly autonomous driving mode or to the autonomous driving mode is performed only if a speed of the vehicle 2 is equal to or below a predefined speed. The level of the predefined speed may be selected based on the type of driving mode, road conditions, traffic conditions, weather conditions, time of the day etc.

The system 4 may further comprise a driving action determining system 30, which may be adapted to distinguish between a normal driving action and a firm driving action, and which may comprise a processing unit and one or more appropriate sensors for performing the functions described herein. As mentioned above, the firm driving action is more forceful than the normal driving action, e.g. by pressing a pedal harder or turning the steering wheel 6 more quickly. The driving action determining system 30 may e.g. be adapted to determine a force used to press the pedal or turn the steering wheel 6. As an alternative, or a complement, the driving action determining system may determine a speed of the action, e.g. the pressing speed for a pedal or the turning speed for a steering wheel 6.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms of the disclosure. Instead, the words used in the specification are words of description rather than limitation, and it is understood that various changes may be made without departing from the spirit and scope of the disclosure.

Additionally, the features of various implementing embodiments may be combined to form further embodiments.

What is claimed is:

1. A method for transition between driving modes of a vehicle, the driving modes comprising an autonomous driving (AD) mode, a partly autonomous driving (PAD) mode and a manual driving (MD) mode, the method comprising:
   (i) performing a transition from the partly autonomous driving (PAD) mode to the autonomous driving (AD) mode by enabling the autonomous driving (AD) mode;
   (ii) performing a transition from the autonomous driving (AD) mode to the partly autonomous driving (PAD) mode by releasing a steering wheel lock when the partly autonomous driving (PAD) mode is in an enabled state;
   (iii) performing a transition from the manual driving (MD) mode to the autonomous driving (AD) mode by enabling the autonomous driving (AD) mode; and
   (iv) performing a transition from the autonomous driving (AD) mode to the manual driving (MD) mode by releasing the steering wheel lock when the partly autonomous driving (PAD) mode is in a disabled state;
   wherein releasing the steering wheel lock in (ii) and/or (iv) comprises (a) disabling the autonomous driving (AD) mode or selecting deactivation, and within a predefined time interval performing at least one action selected from holding a steering wheel, activating a confirmation switch and/or performing a normal driving action, the normal driving action comprising to brake, to steer and/or to accelerate, or (b) performing a firm driving action, the firm driving action comprising to brake, to steer and/or to accelerate, the firm driving action being more forceful than the normal driving action, such as pressing a pedal harder or turning the steering wheel more quickly.

2. The method of claim 1 wherein (i) and/or (iii) further comprises that the transition to the autonomous driving (AD) mode is performed by releasing the steering wheel of the vehicle.

3. The method of claim 1 further comprising:
   (v) performing a transition from the manual driving (MD) mode to the partly autonomous driving (PAD) mode by enabling the partly autonomous driving (PAD) mode; and
   (vi) performing a transition from the partly autonomous driving (PAD) mode to the manual driving (MD) mode by de-activating the partly autonomous driving (PAD) mode by braking, steering, selecting deactivation and/or by disabling the partly autonomous driving (PAD) mode.

4. The method of claim 1 wherein a transition to the partly autonomous driving (PAD) mode or to the autonomous driving (AD) mode is performed only if a speed of the vehicle is equal to or below a predefined speed.

5. The method of claim 1 wherein the actions in (iii) and/or (v) further comprises selecting resume to resume a previous setting.

6. The method of claim 1 further comprising transmitting an information signal indicating which of the driving modes is being utilized.

7. The method of claim 6 wherein a perceived turning resistance of the steering wheel is related to which of the driving modes is being utilized at that moment.

8. The method of claim 1 further comprising transmitting an information signal if the steering wheel is touched while driving in the autonomous driving (AD) mode, the information signal comprising changing appearance of an enabling switch for the autonomous driving (AD) mode.

9. The method of claim 1 wherein the partly autonomous driving (PAD) mode is enabled or disabled while being in the autonomous driving (AD) mode.

10. A system for performing transitions between driving modes of a vehicle, the driving modes comprising an autonomous driving (AD) mode, a partly autonomous driving (PAD) mode and a manual driving (MD) mode, the transitions comprising (i) transition from the partly autonomous driving (PAD) mode to the autonomous driving (AD) mode by enabling the autonomous driving (AD) mode, (ii) transition from the autonomous driving (AD) mode to the partly autonomous driving (PAD) mode by releasing a steering wheel lock when the partly autonomous driving (PAD) mode is in an enabled state, (iii) transition from the manual driving (MD) mode to the autonomous driving (AD) mode by enabling the autonomous driving (AD) mode, and (iv) transition from the autonomous driving (AD) mode to the manual driving (MD) mode by releasing the steering wheel lock when the partly autonomous driving (PAD) mode is in a disabled state, the system comprising:
   an enabling switch for enabling and disabling the autonomous driving (AD) mode;
   an enabling switch for enabling and disabling the partly autonomous driving (PAD) mode;
   a confirmation switch for confirming a previous action; and
   a hand presence determining system for determining at least one hand on the steering wheel of the vehicle.

11. The system of claim 10 further comprising at least one additional switch having at least two states, wherein a first state corresponds to activation and a second state corresponds to deactivation, the at least one additional switch comprising a "+" switch for increasing a set speed of an active driving mode, a "−" switch for decreasing a set speed of the active driving mode, a "resume" switch for resuming a previous setting, and/or a "0" switch for deactivating the active driving mode.

12. The system of claim 11 wherein the enabling switch for the autonomous driving (AD) mode, the enabling switch for the partly autonomous driving (PAD) mode and/or the at least one additional switch is/are adapted to be located on the steering wheel of the vehicle.

13. The system of claim 10 further comprising a driving action determining system, the driving action determining system adapted to distinguish between a normal driving action and a firm driving action, the firm driving action being more forceful than the normal driving action, such as by pressing a pedal harder or turning the steering wheel more quickly.

14. A vehicle comprising a system according claim 10, a steering wheel, a system for autonomous driving (AD), and a system for partly autonomous driving (PAD).

* * * * *